(12) United States Patent
Sahlström et al.

(10) Patent No.: US 12,073,672 B2
(45) Date of Patent: Aug. 27, 2024

(54) DETERMINING WHEN A PORTABLE KEY DEVICE IS LOCATED ON A FRONT SIDE OR ON A BACK SIDE

(71) Applicant: ASSA ABLOY AB, Stockholm (SE)

(72) Inventors: Anders Sahlström, Stockholm (SE); Fredrik Einberg, Huddinge (SE); Mattias Haeger, Solna (SE); Mats Cederblad, Sigtuna (SE)

(73) Assignee: ASSA ABLOY AB, Stockholm (SE)

(*) Notice: Subject to any disclaimer, the term of this patent is extended or adjusted under 35 U.S.C. 154(b) by 14 days.

(21) Appl. No.: 18/009,272

(22) PCT Filed: Jun. 1, 2021

(86) PCT No.: PCT/EP2021/064696
§ 371 (c)(1),
(2) Date: Dec. 8, 2022

(87) PCT Pub. No.: WO2021/249832
PCT Pub. Date: Dec. 16, 2021

(65) Prior Publication Data
US 2023/0222855 A1    Jul. 13, 2023

(30) Foreign Application Priority Data
Jun. 9, 2020 (SE) .................................... 2050676-2

(51) Int. Cl.
*G07C 9/00* (2020.01)
*G01S 13/76* (2006.01)
(52) U.S. Cl.
CPC ........ *G07C 9/00309* (2013.01); *G01S 13/765* (2013.01); *G07C 2209/63* (2013.01)

(58) Field of Classification Search
None
See application file for complete search history.

(56) References Cited

U.S. PATENT DOCUMENTS

2012/0249130 A1* 10/2012 Mok .................... G01R 33/098
324/210
2013/0241694 A1    9/2013 Sharma et al.
(Continued)

FOREIGN PATENT DOCUMENTS

WO    WO 2020/031550    2/2020
WO    WO 2020/091686    5/2020

OTHER PUBLICATIONS

Zouari et al. "Relevant CIR Parameters selection for Fingerprinting Based Location Algorithm," 23rd International Conference on Software, Telecommunications and Computer Networks (SOFTCOM), Sep. 16, 2015, pp. 170-173.
(Continued)

*Primary Examiner* — Carlos Garcia
(74) *Attorney, Agent, or Firm* — Schwegman Lundberg & Woessner, P.A.

(57) ABSTRACT

It is provided a method for determining when a portable key device is located on a front side or on a back side in relation to a barrier secured by an electronic lock. The method is performed in a location determiner and comprises the steps of: obtaining a channel impulse response, CIR, based on an impulse signal transmitted from the portable key device, the CIR being based on a plurality of samples of the impulse signal as received by an antenna being fixedly mounted in relation to the electronic lock; and determining, based on the CIR, whether the portable key device is located on the front side or on the back side.

19 Claims, 5 Drawing Sheets

(56) References Cited

U.S. PATENT DOCUMENTS

| | | |
|---|---|---|
| 2018/0061156 A1 | 3/2018 | Einberg |
| 2019/0004155 A1 | 1/2019 | Eber et al. |
| 2020/0005566 A1 | 1/2020 | Jain et al. |
| 2020/0348406 A1 | 11/2020 | Jain et al. |
| 2023/0221429 A1* | 7/2023 | Haeger ................ G01S 5/0221 342/450 |

OTHER PUBLICATIONS

Official Action for Sweden Patent Application No. 2050676-2, dated Mar. 22, 2021, 5 pages.
International Search Report and Written Opinion for International (PCT) Patent Application No. PCT/EP2021/064696, dated Sep. 3, 2021, 15 pages.
Written Opinion of the International Preliminary Examining Authority for International (PCT) Patent Application No. PCT/EP2021/064696, dated Apr. 28, 2022, 7 pages.
International Preliminary Report on Patentability for International (PCT) Patent Application No. PCT/EP2021/064696, dated Sep. 12, 2022, 16 pages.

* cited by examiner

DETERMINING WHEN A PORTABLE KEY DEVICE IS LOCATED ON A FRONT SIDE OR ON A BACK SIDE

CROSS REFERENCE TO RELATED APPLICATIONS

This application is a national stage application under 35 U.S.C. 371 and claims the benefit of PCT Application No. PCT/EP2021/064696 having an international filing date of Jun. 1, 2021, which designated the United States, which PCT application claimed the benefit of Sweden Patent Application No. 2050676-2 filed Jun. 9, 2020, the disclosure of each of which are incorporated herein by reference.

TECHNICAL FIELD

The present disclosure relates to the field of electronic locks and in particular to determining when a portable key device is located on a front side or on a back side in relation to a barrier secured by an electronic lock.

BACKGROUND

Locks and keys are evolving from the traditional pure mechanical locks. These days, there are wireless interfaces for electronic locks, e.g. by interacting with a portable key device. For instance, Radio Frequency Identification (RFID) has been used as the wireless interface.

When RFID is used, the user needs to present the portable key device in close proximity to a reader connected to the lock. Moreover, RFID requires a relatively large antenna in the reader by the lock and uses a large amount of energy. Significantly, RFID requires a user to actively take out the portable key device (e.g. RFID card or NFC (Near Field Communication) enabled smartphone) and bring it to be within centimetres of the lock. This is inconvenient and potentially insecure, since it is easier for an attacker to steal the portable key device when it is presented to the lock for the access control.

By using other short-range wireless communication with slightly longer communication range, e.g. Bluetooth Low Energy (BLE), Bluetooth or Ultra High Frequency (UHF), the portable key device can stay in a pocket or handbag and still be used for access control. However, the increased range also causes new problems. One problem which occurs if the lock unlocks whenever an authorised portable key device is within range, is that when a person on the inside of an electronic lock walks past the electronic lock, the electronic lock could unintentionally be unlocked, and anyone could gain access to the restricted physical space.

By determining the position of the portable key device in relation to the lock, it can be determined if the portable key device (and thus the user) is on the inside or the outside. In this way, the automatic access control can still be used, but a person walking past on the inside will not trigger the unlock procedure.

SUMMARY

One object is to improve reliability in determining whether a portable key device is on a front side or back side.

According to a first aspect, it is provided a method for determining when a portable key device is located on a front side or on a back side in relation to a barrier secured by an electronic lock. The method is performed in a location determiner and comprises the steps of: obtaining a channel impulse response, CIR, based on an impulse signal transmitted from the portable key device, the CIR being based on a plurality of samples of the impulse signal as received by an antenna being fixedly mounted in relation to the electronic lock; and determining, based on the CIR, whether the portable key device is located on the front side or on the back side.

The front side may be a side with line-of-sight to the antenna and the back side is a side without line-of-sight to the antenna.

The step of obtaining the CIR may comprises obtaining a first CIR from a first antenna and a second CIR from a second antenna, in which case the step of determining is based on determining a difference between the first CIR and the second CIR over the measurement time period.

The difference between the first CIR and the second CIR may be determined by calculating an area between an envelope of the first CIR and an envelope of the second CIR in the measurement time period.

The difference between the first CIR and the second CIR may be determined by calculating a correlation between the envelope of the first CIR 30a and the envelope of the second CIR 30b in the measurement time period 32.

When a difference between the first CIR and the second CIR is larger than a threshold, this may indicate that the portable key device is on the back side and when a difference between the first CIR and the second CIR is less than a threshold, this may indicate that the portable key device is on the front side.

The step of determining may be based on the shape of the CIR in the measurement time period.

The step of determining may be based comparing on energy of the CIR in a first time period with an energy of the CIR in a second time period, wherein the first time period and the second time period are both part of the measurement time period.

The step of determining may be based on a machine learning model having its output being whether the portable key device is located on the front side or on the back side in relation to the barrier, and the machine learning model having its input being the CIR.

The impulse signal may be an ultra-wideband, UWB, signal.

According to a second aspect, it is provided a location determiner for determining whether a portable key device is located on a front side or on a back side in relation to a barrier secured by an electronic lock. The location determiner comprises: a processor; and a memory storing instructions that, when executed by the processor, cause the location determiner to: obtain a channel impulse response, CIR, based on an impulse signal transmitted from the portable key device, the CIR being based on a plurality of samples of the impulse signal as received by an antenna being fixedly mounted in relation to the electronic lock; and determine, based on the CIR, whether the portable key device is located on the front side or on the back side.

The front side may be a side with line-of-sight to the antenna, in which case the back side is a side without line-of-sight to the antenna.

The instructions to obtain the CIR may comprise instructions that, when executed by the processor, cause the location determiner to obtain a first CIR from a first antenna and a second CIR from a second antenna, in which case the instructions to determine comprise instructions that, when executed by the processor, cause the location determiner to determine a difference between the first CIR and the second CIR over the measurement time period.

The difference between the first CIR and the second CIR may be determined by calculating an area between an envelope of the first CIR and an envelope of the second CIR in the measurement time period.

The difference between the first CIR and the second CIR may be determined by calculating a correlation between the envelope of the first CIR 30*a* and the envelope of the second CIR 30*b* in the measurement time period 32.

When a difference between the first CIR and the second CIR is larger than a threshold, this may indicate that the portable key device is on the back side and when a difference between the first CIR and the second CIR is less than a threshold, this may indicate that the portable key device is on the front side.

The instructions to determine may comprise instructions that, when executed by the processor, cause the location determiner to determine the side based on the shape of the CIR in the measurement time period.

The instructions to determine may comprise instructions that, when executed by the processor, cause the location determiner to determine the side based on comparing on energy of the CIR in a first time period with an energy of the CIR in a second time period, in which case the first time period and the second time period are both part of the measurement time period.

The instructions to determine may comprise instructions that, when executed by the processor, cause the location determiner to determine the side based on a machine learning model having its output being whether the portable key device is located on the front side or on the back side in relation to the barrier, and the machine learning model having its input being the CIR.

The impulse signal may be an ultra-wideband, UWB, signal.

According to a third aspect, it is provided a computer program for determining whether a portable key device is located on a front side or on a back side in relation to a barrier secured by an electronic lock. The computer program comprises computer program code which, when executed on a location determiner causes the location determiner to: obtain a channel impulse response, CIR, based on an impulse signal transmitted from the portable key device, the CIR being based on a plurality of samples of the impulse signal as received by an antenna being fixedly mounted in relation to the electronic lock; and determine, based on the CIR, whether the portable key device is located on the front side or on the back side.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Embodiments presented herein determine when a portable key device is located on a front side or on a back side in relation to a barrier (e.g. a door), based on a channel impulse response (CIR). An impulse is transmitted by the portable key device and the CIR is based on reception by an antenna being fixed in relation to an electronic lock. Depending on whether the portable key device is located on the front side or back side, this will affect the CIR received by the fixed antenna. This allows a convenient and reliable determination of front side or back side, allowing access control e.g. to be performed only when the portable key device is on the front side (i.e. outside) of the barrier.

Figure 1:
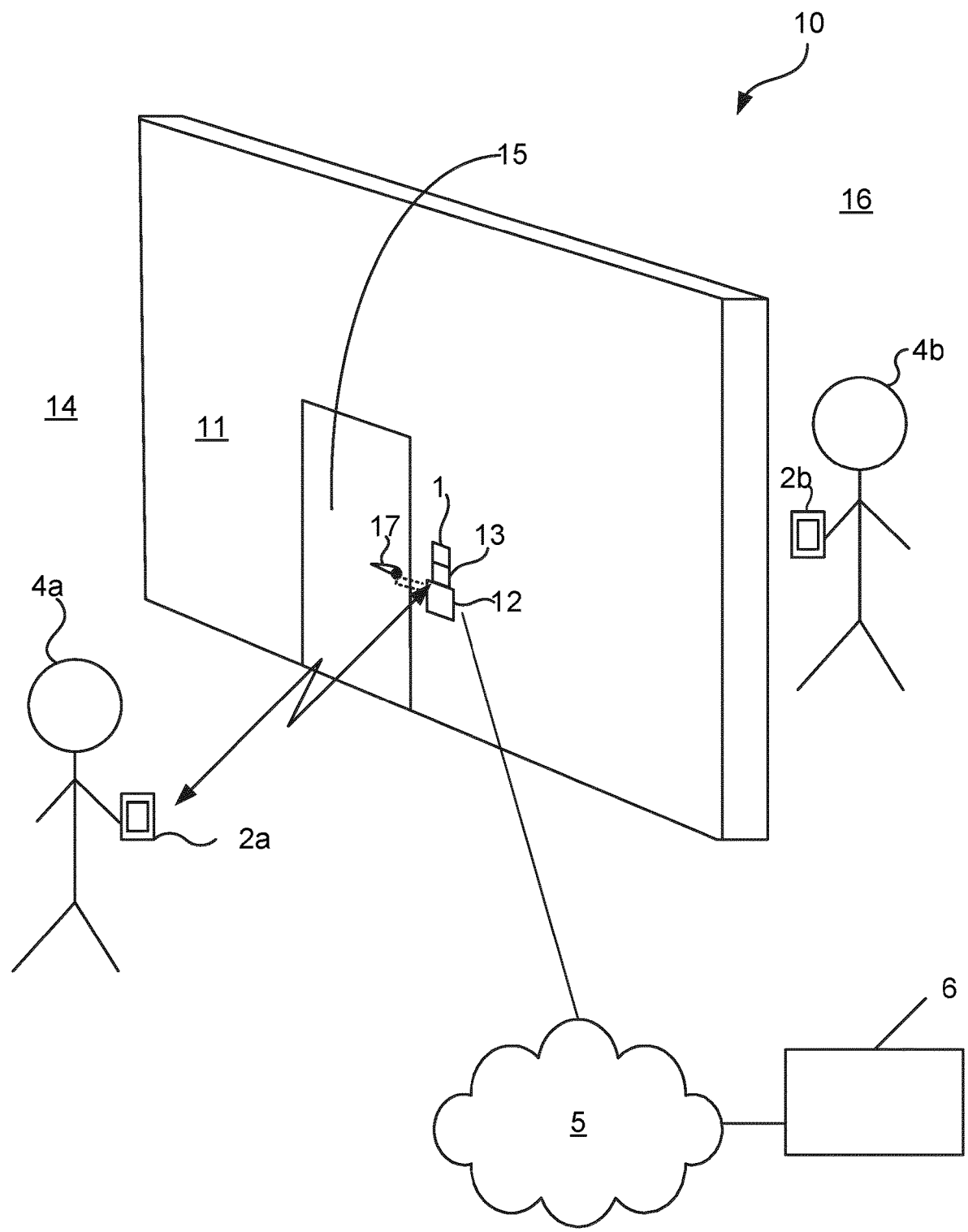
FIG. 1 is a schematic diagram showing an electronics access control system being an environment in which embodiments presented herein can be applied.

FIG. 1 is a schematic diagram showing an electronics access control system 10 being an environment in which embodiments presented herein can be applied. Access to a back side 16 of a location determiner 1 is restricted by a physical barrier 15, which is selectively unlockable. The physical barrier 15 stands between the back side 16 of the location determiner and a front side 14 of the location determiner. The back side 16 of the location determiner 1 is restricted physical space and the front side 14 of the location determiner 1 is an accessible physical space. Note that the front side 14 of the location determiner 1 can be a restricted physical space in itself, but in relation to this particular location determiner 1 the front side 14 of the location determiner is accessible. In other words, the back side 16 of the location determiner 1 is inside the physical barrier 15 and the front side 14 of the location determiner is outside the physical barrier 15. The barrier 15 can be a door, gate, hatch, window, drawer, etc. A handle 17 or doorknob is provided to allow opening of the barrier 15, once unlocked. In order to unlock or lock the barrier 15, an electronic lock 12 is provided. The electronic lock 12 can be in an unlocked state or locked state. The electronic lock 12 can be separate from, but connected to, the location determiner 1 or can form part of the location determiner 1 (not shown). The barrier 15 is provided in a surrounding fixed structure ii, such as a wall, fence or vehicle.

The location determiner 1 comprises one or more antennas 13. Each antenna is fixedly mounted in relation to the electronic lock 12. Each antenna can be a directional antenna, where gain varies depending on direction of reception or transmission. In such a case, the antenna(s) face the front side 14 of the location determiner 1. This implies that the antenna(s) 13 have line-of-sight with portable key devices in the front side 14 of the location determiner. Line-of-sight is to be interpreted as line of sight in terms of radio signal propagation. In other words, there may be a thin plastic cover or similar protecting the antenna(s) 13 from the space on the front side 14 of the location determiner 1. The direction that the antennas 13*a*, 13*b* is facing is the direction in which reception and transmission of signals occur best. Hence, when the antenna(s) are directional antenna(s), the maximum gain of the antenna(s) faces the front side 14. This can e.g. be achieved with a ground plane provided on the opposite side (the back side) of the antennas, see below.

The front side 14 can be defined as the side of the location determiner that provides line-of-sight communication with a portable key device and the back side 16 can be defined as the opposite side, i.e. the side of the location determiner that does not provide line-of-sight communication with a portable key device.

The location determiner 1 is used to determine when any portable key devices, such as a first portable key device 2*a* and a second portable key device 2*b* in the vicinity of the electronic lock 12 is located on the front side 14 or the back side 16 of the location determiner 1. This determination is based in relation to the location determiner 1 and can e.g. be based on UWB (ultra-wideband) technology. UWB provides great accuracy of device positioning but at the cost of relatively large energy usage. Alternatively or additionally, the positioning module 13 can be based on other positioning technologies.

The electronic lock 12 is able to receive and send signals from/to portable key devices 2*a-b* over a communication channel which may be a short-range wireless interface. The electronic lock 12 can use the same antenna(s) 13 used by the location determiner 1 for the short-range wireless interface.

Optionally, the electronic lock 12 comprises a separate unit, also known as an access control reader, for communicating with the portable key devices 2*a-b* and evaluating access. In this example, there is a first portable key device 2*a* and a second portable key device 2*b*. The portable key devices 2*a-b* are implemented using any suitable device which is portable by a user and which can be used by the electronic lock 12 to evaluate whether to grant access or not by communicating over the communication channel. The portable key devices can comprise digital cryptographic keys for electronic authentication.

The portable key devices 2*a-b* are typically carried or worn by a user and may be implemented as a smart phone, wearable device, key fob, etc. In this example, the first portable key device 2*a* is carried by a first user 4*a* and the second portable key device 2*b* is carried by a second user 4*b*. The first user 4*a* and the first portable key device 2*a* are located on the front side 14 of the location determiner 1 (i.e. outside the electronic lock 12) and the second user 4*b* and the second portable key device 2*b* are located on back side 16 of the location determiner (i.e. inside the electronic lock 12).

The short-range wireless interface between the portable key devices 2*a-b* and the electronic lock 12 is a radio frequency wireless interface and could e.g. employ Bluetooth Low Energy (BLE), Bluetooth, ZigBee, Radio Frequency Identification (RFID), any of the IEEE 802.11 standards, any of the IEEE 802.15 standards, etc. Using the communication channel, the portable key devices 2*a-b* can be authenticated and authorisation determination (access control) can be performed by the electronic lock 12 or the access control reader. The communication over the short-range wireless interface can be encrypted.

When the access control by the electronic lock 12 results in granted access, the electronic lock 12 is set in an unlocked state. When the electronic lock 12 is in the unlocked state, the barrier 15 can be opened and when the electronic lock 12 is in a locked state, the barrier 15 cannot be opened. In this way, access to the back side 16 of the location determiner 1 is controlled by the electronic lock 12. It is to be noted that the electronic lock 12 can be mounted in the fixed structure ii by the physical barrier 15 (as shown) or in the physical barrier 15 itself (not shown).

The electronic lock 12 can perform an access control for any portable key device 2*a-b* presented to it. However, according to embodiments presented herein, access can only be granted after the portable key device 2*a* is determined to be on the front side 14 of the location determiner. The reason for this is that if access is granted by the electronic lock 12 whenever a portable key device is within communicable range, the second portable key device 2*b* in the restricted physical space 16 (i.e. on the inside) can result in the electronic lock 12 unlocking when the second user 5 walks by, without intending to unlock the electronic lock 12 to open the barrier. An unauthorised person could then open the barrier 15 and gain access to the restricted physical space 16.

The electronic lock optionally contains communication capabilities to connect to a server 6 for the electronics access control system 10 via a network 5. The network can be a wide area network, such as the Internet, to which the portable key devices 2*a-b* can connect e.g. via WiFi (e.g. any of the IEEE 802.11x standards) or a cellular network, e.g. LTE (Long Term Evolution), next generation mobile networks (fifth generation, 5G), UMTS (Universal Mobile Telecommunications System) utilising W-CDMA (Wideband Code Division Multiplex), etc.

Figure 2:
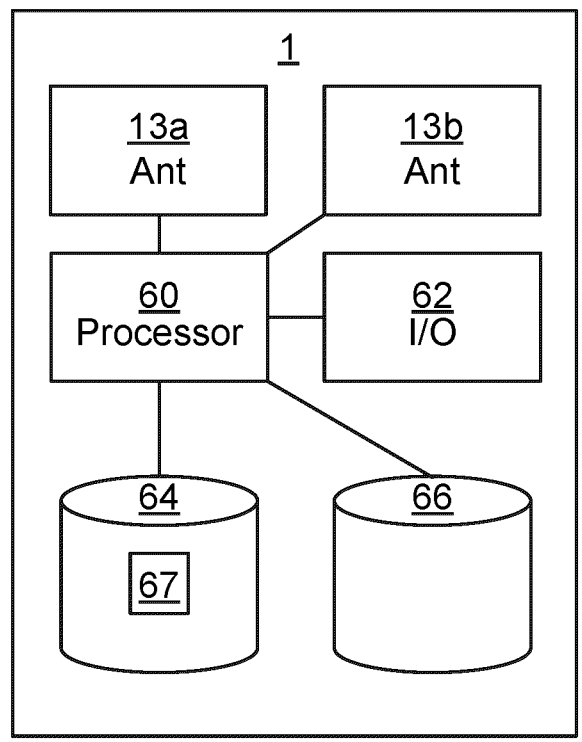
FIG. 2 is a schematic diagram illustrating components of the location determiner of FIG. 1.

FIG. 2 is a schematic diagram illustrating components of the location determiner 1 of FIG. 1. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 6 below.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The location determiner 1 further comprises an I/O interface 62 for communicating with external and/or internal entities. Optionally, the I/O interface 62 also includes a user interface. In this embodiment, the location determiner 1 comprises two separate antennas 13a-b. However, the location determiner can be embodied with any suitable number of antennas.

Other components of the location determiner 1 are omitted in order not to obscure the concepts presented herein.

Figure 3A:
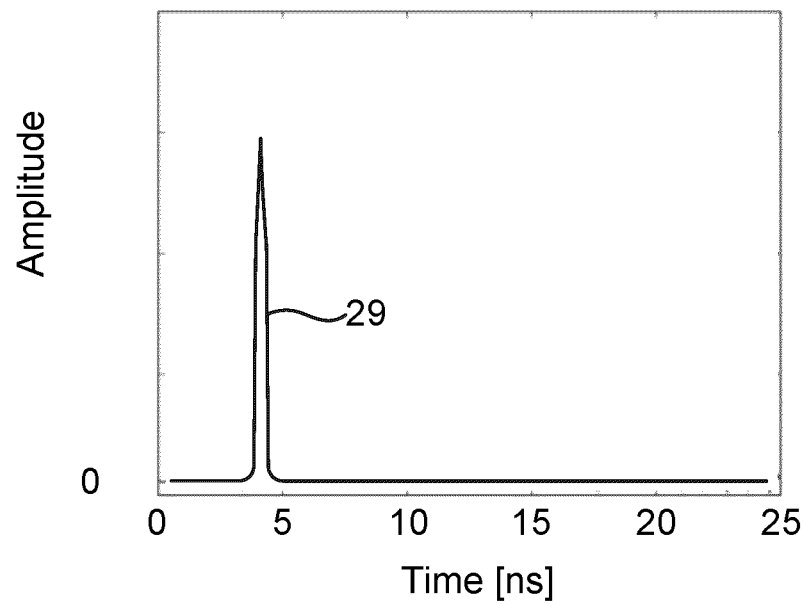
FIGS. 3A-B are schematic graphs illustrating an impulse signal from a portable key device and a corresponding channel impulse response.
Figure 3B:
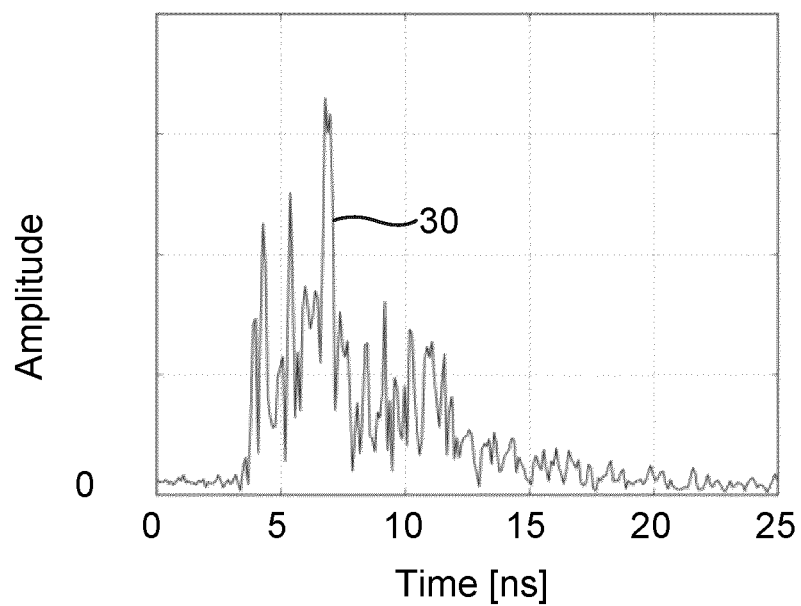

FIGS. 3A-B are schematic graphs illustrating an UWB impulse signal 29 from a portable key device 2a, 2b and a corresponding channel impulse response (CIR). The horizontal axis represents time and the vertical axis represents amplitude.

In FIG. 3A, the UWB impulse signal 29 from the portable key device is shown, in the form it is generated and transmitted from the portable key device. The UWB impulse signal 29 can be transmitted by the portable key device based on a command triggered by the location determiner.

In FIG. 3B, a CIR 3o is shown. The CIR 30 is how the UWB impulse signal 29 is received, in this case by one of the antennas 13a, 13b of the location determiner. Due to attenuation, reflection, absorption, antenna shape and other radio environment factors, the CIR 30 differs in shape from the UWB impulse signal 29.

Since the radio environment factors differ significantly if the UWB impulse signal is received from the front side 14, in an line-of-sight situation, and if the UWB impulse signal is received from the back side 16, the CIR can be used to determine if the transmitter of the UWB impulse signal 29, i.e. a portable key device, is located on the front side 14 or the back side 16 of the location determiner.

Figure 4A:
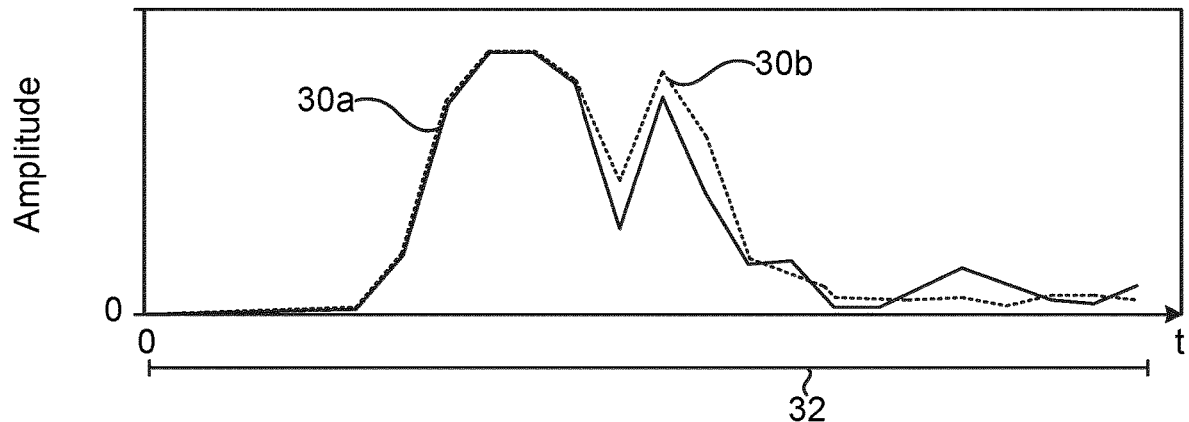
FIGS. 4A and 4B are schematic graphs illustrating how the CIR differs between different antennas.
Figure 4B:
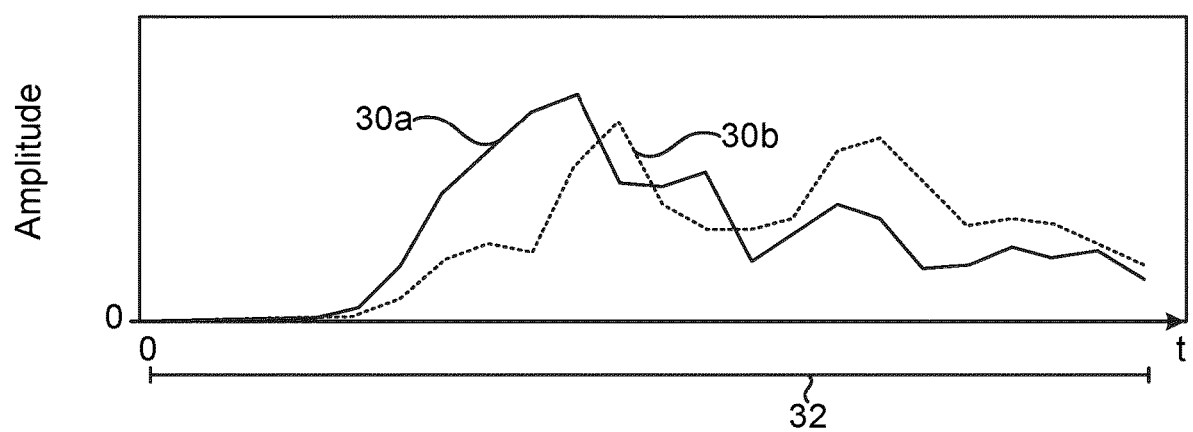

FIGS. 4A and 4B are schematic graphs illustrating how the CIR differs between different antennas. A first CIR 30a is shown, being the envelope of the signal received by a first antenna. A second CIR 30b is shown, being the envelope of the signal received by a second antenna.

In FIG. 4A, the first CIR 30a and the second CIR 30b are shown based on the portable key device transmitting the UWB impulse signal 29 from the front side 14. It can be seen how the first CIR 30a and the second CIR 30b are very similar and follow each other very well over a measurement period 32. When the UWB impulse signal 29 is received from the front side 14, there is line-of-sight to the antennas. In this case, the difference between the CIR shapes for the two antennas is very small.

In FIG. 4B, the first CIR 30a and the second CIR 30b are shown based on the portable key device transmitting the UWB impulse signal from the back side 16. In this case, the radio signal will experience different radio environments, and is affected differently by reflection and absorption, resulting in a significant difference between the shapes of the first CIR 30a and the second CIR 30b.

Due to the difference in how well the CIRs 30a-b match when the portable key device is on the front side 14 or the back side 16, the location determiner 1 can deduce that the portable key device is on the front side 14 if the difference between the CIR shapes for the two antennas 13a, 13b is less than a threshold and that the portable key device is on the back side if the difference between the CIR shapes for the two antennas 13a, 13b is greater than a threshold.

Figure 5A:
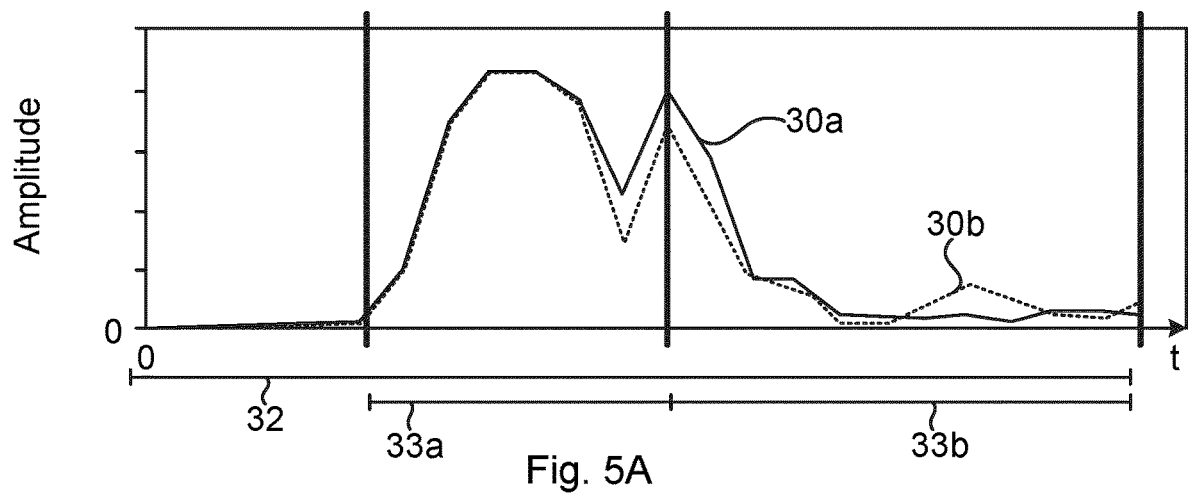
FIGS. 5A and 5B are schematic graphs illustrating how the CIR diffuses differently based on when the portable key device is on the front side or back side of the location determiner.
Figure 5B:
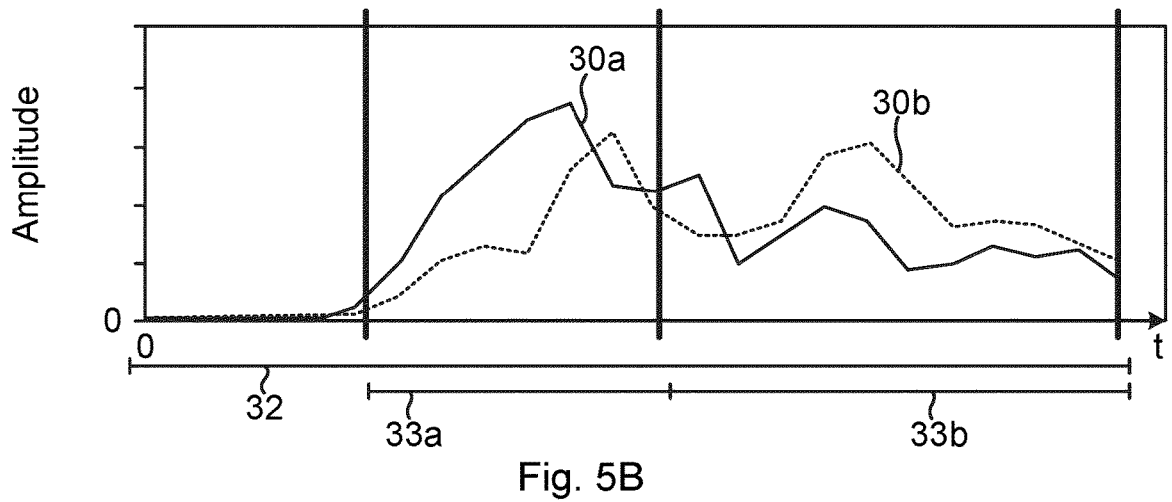

FIGS. 5A and 5B are schematic graphs illustrating how the CIR diffuses differently based on when the portable key device is on the front side or back side of the location determiner. A first CIR 30a is shown, being the envelope of the signal received by a first antenna. A second CIR 30b is shown, being the envelope of the signal received by a second antenna. The measurement period 32 here contains a first time period 33a and a second time period 33b. The first time period 33a and the second time period 33b do not need to cover the entire measurement period 32. In one embodiment, the first time period 33a and the second time period 33b do not overlap. The first time period 33a and the second time period 33b can be fixed to a preconfigured duration, e.g. from when the CIR is greater than a particular amplitude, and the second time period 33b following the first time period 33a with a preconfigured duration. Alternatively, the first time period and the second time period can be determined dynamically based on pre-determined rules.

In FIG. 5A, the first CIR 30a and the second CIR 30b are shown based on the portable key device transmitting the UWB impulse signal 29 from the front side 14.

There is here a line-of-sight between the portable key device and the antennas, in which case the CIR reasonably well reflects the UWB impulse signal 29. When the portable key device is on the front side 14, there is thus a significant amount of energy received in the first time period 33a than in the second time period 33b. Energy can be defined as the integration of the CIR in question in the time period, i.e. the area under the CIR.

In FIG. 5B, the first CIR 30a and the second CIR 30b are shown based on the portable key device transmitting the UWB impulse signal 29 from the back side 16.

In this situation, the UWB impulse signal is reflected and absorbed by different materials before being received by the antenna(s). This diffuses the UWB impulse signal, resulting in CIRs that are more spread out in energy over time, compared to when the portable key device is on the front side.

In other words, when the portable key device is on the back side 16, the energy of the CIR(s) in the second time period 33b is more similar to the amount of energy of the CIR(s) in the first time period 33a.

Figure 6:
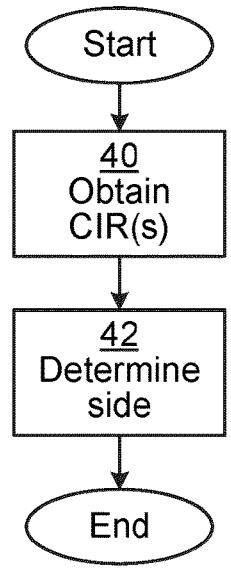
FIG. 6 is a flow chart illustrating embodiments of methods for determining when a portable key device is located on a front side or on a back side in relation to a barrier secured by an electronic lock.

The determination of side of the portable key device can thus be determined by evaluating a quote between the energy of a CIR in the first time period 33a in relation to the energy of the CIR in the second time period 33b. This quote can be for each CIR or a combination of CIRs. It is to be noted that there can be more time periods than two. For instance, there can be three time periods and one or several ratios of energy between the different time periods can be used to determine on which side the portable key device is located FIG. 6 is a flow chart illustrating embodiments of methods for determining when a portable key device 2a, 2b is located on a front side 14 or on a back side 16 in relation to a barrier 15 secured by an electronic lock 12. The embodiments of the methods are performed in the location determiner 1. The front side 14 can be defined as a side of the location determiner with line-of-sight to the antenna(s) 13, 13a, 13b and the back side 16 can be defined as a side without line-of-sight to the antenna 13, 13a, 13b.

In an obtain CIR(s) step 40, the location determiner obtains one or more CIRs, 30a, 30b, 30c based on an impulse signal 29 transmitted from the portable key device 2a, 2b. Each CIR 30a, 30b, 30c is based on a plurality of samples of the impulse signal 29 as received by a respective antenna 13, 13a, 13b. As mentioned above, each antenna 13, 13a, 13b is fixedly mounted in relation to the electronic lock 12.

This step can comprise obtaining a first CIR 30a from a first antenna 13a and a second CIR 30b from a second antenna 13b.

In a determine side step 42, location determiner determines, based on the CIR, whether the portable key device 2a, 2b is located on the front side 14 or on the back side 16. This determination considers the shape of the CIR, and not only to find the first peak. For instance, the determination can consider a measurement time period 35 of the CIR that contain at least two peaks. The determination of side is based on the shape of the CIR in the measurement time period 32.

When the first CIR 30a and the second CIR 30b are obtained in the preceding step 40, the determining of side can be based on determining a difference between the first CIR and the second CIR over the measurement time period, as illustrated in FIGS. 4A and 4B and explained above.

The difference between the first CIR and the second CIR can be determined by calculating an area between an envelope of the first CIR 30a and an envelope of the second CIR 30b in the measurement time period 32.

The difference between the first CIR and the second CIR can be determined by calculating a correlation between the envelope of the first CIR 30a and the envelope of the second CIR 30b in the measurement time period 32.

In the determination of side, when a difference between the first CIR and the second CIR is larger than a threshold, this can indicate that the portable key device 2a, 2b is on the back side 16. Analogously, when a difference between the first CIR and the second CIR is less than a threshold, this can indicate that the portable key device 2a, 2b is on the front side 14.

In one embodiment, the determination of side is based comparing on energy of the CIR in a first time period 33a with an energy of the CIR in a second time period 33b, wherein the first time period 33a and the second time period 33b are both part of the measurement time period. This is illustrated in FIGS. 5A-B and is described above.

Optionally, the determination of side is based on a machine learning model having its output being whether the portable key device is located on the front side or on the back side in relation to the barrier, and the machine learning model having its input being the CIR.

Optionally, the presented method can be combined with angle-of-arrival measurements for improved accuracy. The angle-of-arrival measurements are based on a time difference between the two antennas 13a, 13b of receiving the UWB signal. The angle-of-arrival defines a direction to the portable key device from the antennas. For instance, in one embodiment, if the distance is determined to be less than a threshold distance, and the angle-of-arrival is in a predefined range, and the method described above indicates that the portable key device is on the outside (i.e. front side), access can be granted (if the portable key device is authenticated and is authorised access).

Figure 7:
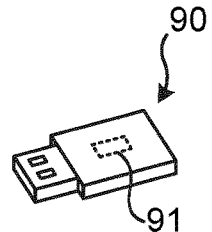
FIG. 7 shows one example of a computer program product comprising computer readable means.

FIG. 7 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 6. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for determining when a portable key device is located on a front side or on a back side in relation to a barrier secured by an electronic lock, the method being performed in a location determiner and comprising:
obtaining a channel impulse response, CIR, based on an impulse signal transmitted from the portable key device, the CIR being based on a plurality of samples of the impulse signal as received by at least one antenna being fixedly mounted in relation to the electronic lock; and
determining, based on the CIR, whether the portable key device is located on the front side or on the back side;
wherein obtaining the CIR comprises obtaining a first CIR from a first antenna and a second CIR from a second antenna and wherein determining is based on determining a difference between the first CIR and the second CIR over a measurement time period, wherein both the first antenna and the second antenna face the front side.

2. The method according to claim 1, wherein the front side is a side with line-of-sight to the at least one antenna and the back side is a side without line-of-sight to the at least one antenna.

3. The method according to claim 1, wherein the difference between the first CIR and the second CIR is determined by calculating an area between an envelope of the first CIR and an envelope of the second CIR in the measurement time period.

4. The method according to claim 1, wherein the difference between the first CIR and the second CIR is determined by calculating a correlation between the envelope of the first CIR and the envelope of the second CIR in the measurement time period.

5. The method according to claim 1, wherein a difference between the first CIR and the second CIR larger than a threshold indicates that the portable key device is on the back side and a difference between the first CIR and the second CIR less than a threshold indicates that the portable key device is on the front side.

6. The method according to claim 1, wherein determining is based on the shape of the CIR in the measurement time period.

7. The method according to claim 1, wherein determining is based on comparing on energy of the CIR in a first time period with an energy of the CIR in a second time period, wherein the first time period and the second time period are both part of the measurement time period.

8. The method according to claim 1, wherein determining is based on a machine learning model having its output being whether the portable key device is located on the front side or on the back side in relation to the barrier, and the machine learning model having its input being the CIR.

9. The method according to claim 1, wherein the impulse signal is an ultra-wideband, UWB, signal.

10. A location determiner for determining whether a portable key device is located on a front side or on a back side in relation to a barrier secured by an electronic lock, the location determiner comprising:
a processor; and
a memory storing instructions that, when executed by the processor, cause the location determiner to:
obtain a channel impulse response, CIR, based on an impulse signal transmitted from the portable key device, the CIR being based on a plurality of samples of the impulse signal as received by at least one antenna being fixedly mounted in relation to the electronic lock; and
determine, based on the CIR, whether the portable key device is located on the front side or on the back side;
wherein the instructions to obtain the CIR comprise instructions that, when executed by the processor, cause the location determiner to obtain a first CIR from a first antenna and a second CIR from a second antenna and wherein the instructions to determine comprise instructions that, when executed by the processor, cause the location determiner to determine a difference between the first CIR and the second CIR over a measurement time period, wherein both the first antenna and the second antenna face the front side.

11. The location determiner according to claim 10, wherein the front side is a side with line-of-sight to the at least one antenna and the back side is a side without line-of-sight to the at least one antenna.

12. The location determiner according to claim 10, wherein the difference between the first CIR and the second CIR is determined by calculating an area between an envelope of the first CIR and an envelope of the second CIR in the measurement time period.

13. The location determiner according to claim 10, wherein the difference between the first CIR and the second CIR is determined by calculating a correlation between the envelope of the first CIR and the envelope of the second CIR in the measurement time period.

14. The location determiner according to claim 10, wherein a difference between the first CIR and the second CIR larger than a threshold indicates that the portable key device is on the back side and a difference between the first CIR and the second CIR less than a threshold indicates that the portable key device is on the front side.

15. The location determiner according to claim 10, wherein the instructions to determine comprise instructions that, when executed by the processor, cause the location determiner to determine the side based on the shape of the CIR in the measurement time period.

16. The location determiner according to claim 10, wherein the instructions to determine comprise instructions that, when executed by the processor, cause the location determiner to determine the side based on comparing on energy of the CIR in a first time period with an energy of the CIR in a second time period, wherein the first time period and the second time period are both part of the measurement time period.

17. The location determiner according to claim 10, wherein the instructions to determine comprise instructions that, when executed by the processor, cause the location determiner to determine the side based on a machine learning model having its output being whether the portable key device is located on the front side or on the back side in relation to the barrier, and the machine learning model having its input being the CIR.

18. The location determiner according to claim 10, wherein the impulse signal is an ultra-wideband, UWB, signal.

19. A non-transitory computer-readable medium comprising a computer program stored thereon for determining whether a portable key device is located on a front side or on a back side in relation to a barrier secured by an electronic lock, the computer program comprising computer program code which, when executed on a location determiner causes the location determiner to:
obtain a channel impulse response, CIR, based on an impulse signal transmitted from the portable key device, the CIR being based on a plurality of samples of the impulse signal as received by at least one antenna being fixedly mounted in relation to the electronic lock; and
determine, based on the CIR, whether the portable key device is located on the front side or on the back side;
wherein the computer program code to obtain the CIR comprises computer program code which, when executed on a location determiner causes the location determiner to obtain a first CIR from a first antenna and a second CIR from a second antenna and wherein the computer program code to determine comprises computer program code which, when executed on a location determiner causes the location determiner to determine a difference between the first CIR and the second CIR over a measurement time period, wherein both the first antenna and the second antenna face the front side.

* * * * *